United States Patent
Irizarry-Rosado

(10) Patent No.: US 11,448,080 B2
(45) Date of Patent: Sep. 20, 2022

(54) GUIDE VANE FOR A GAS TURBINE ENGINE AND METHOD FOR TESTING A BOND SEAL OF A GUIDE VANE FOR A GAS TURBINE ENGINE

(71) Applicant: United Technologies Corporation, Farmington, CT (US)

(72) Inventor: Xiomara Irizarry-Rosado, East Hampton, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 198 days.

(21) Appl. No.: 16/790,359

(22) Filed: Feb. 13, 2020

(65) Prior Publication Data
US 2021/0254471 A1 Aug. 19, 2021

(51) Int. Cl.
*F01D 9/04* (2006.01)
*F01D 5/28* (2006.01)
*G01N 19/04* (2006.01)

(52) U.S. Cl.
CPC ............. *F01D 9/044* (2013.01); *F01D 5/282* (2013.01); *G01N 19/04* (2013.01); *F05D 2220/323* (2013.01); *F05D 2220/36* (2013.01); *F05D 2230/23* (2013.01); *F05D 2230/60* (2013.01); *F05D 2260/80* (2013.01); *F05D 2260/83* (2013.01); *F05D 2300/133* (2013.01); *F05D 2300/603* (2013.01)

(58) Field of Classification Search
CPC ...... F01D 5/282; F01D 9/044; F05D 2220/36; F05D 2230/23; F05D 2230/60; F05D 2260/80; F05D 2260/83; F05D 2300/133; F05D 2300/603; B29C 65/82; B29C 65/8207; B29C 65/8215; B29C 65/8223; G01N 3/00; G01N 3/24; G01N 19/04; G01N 2203/0025; G01N 2203/0091; G01N 2203/0278; G01N 2203/0282
USPC .... 73/112.01, 116.03, 116.04, 150 R, 150 A, 73/865.9; 156/293
See application file for complete search history.

(56) References Cited

U.S. PATENT DOCUMENTS

| 4,282,758 | A | * | 8/1981 | Wootten | G01L 5/0033 |
|---|---|---|---|---|---|
| | | | | | 257/E21.53 |
| 4,282,759 | A | | 8/1981 | Merrell | |
| 5,841,034 | A | * | 11/1998 | Ball | G01N 19/04 |
| | | | | | 73/800 |
| 8,596,969 | B2 | | 12/2013 | Chuong et al. | |
| 9,605,563 | B2 | | 3/2017 | Chardonnet et al. | |
| 10,483,659 | B1 | | 11/2019 | Lyders et al. | |
| 2019/0368363 | A1 | * | 12/2019 | Walston | F01D 9/044 |

FOREIGN PATENT DOCUMENTS

| EP | 1367037 A2 | 12/2003 |
|---|---|---|
| FR | 2989414 A1 | 10/2013 |

OTHER PUBLICATIONS

European Search Report for Application No. 21 15 7178.

* cited by examiner

*Primary Examiner* — Courtney D Heinle
*Assistant Examiner* — Danielle M. Christensen
(74) *Attorney, Agent, or Firm* — Cantor Colburn LLP

(57) ABSTRACT

A vane guide assembly for a gas turbine engine, the vane guide assembly including: an airfoil having an end bonded to an opening of a platform by an adhesive; and a pull tab partially located in the adhesive and having a portion extending from a bondline formed by the adhesive.

20 Claims, 4 Drawing Sheets

GUIDE VANE FOR A GAS TURBINE ENGINE AND METHOD FOR TESTING A BOND SEAL OF A GUIDE VANE FOR A GAS TURBINE ENGINE

BACKGROUND

This disclosure relates to guide vanes for a gas turbine engine, and more particularly to a guide vane with bonded airfoils and a method for testing the strength of the bonds of the airfoils of the guide vanes.

Gas turbine engines typically include a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

The fan section drives air through a bypass passage. Fan exit guide vanes are provided in the bypass passage aft of the fan section to straighten air flow leaving the fan. Fan exit guide vanes include airfoils extending between inner and outer platforms. The airfoils of the fan exit guide vanes are bonded to the inner and outer platforms. As such, it is desirable to provide method for quickly and accurately testing the strength of the bond between the airfoils of the fan exit guide vanes and the inner and outer platforms.

BRIEF DESCRIPTION

Disclosed is a vane guide assembly for a gas turbine engine. The vane guide assembly including: an airfoil having an end bonded to an opening of a platform by an adhesive; and a pull tab partially located in the adhesive and having a portion extending from a bondline formed by the adhesive.

In addition to one or more of the features described above, or as an alternative to any of the foregoing embodiments, the platform is an outer diameter platform or an inner diameter platform.

In addition to one or more of the features described above, or as an alternative to any of the foregoing embodiments, an exterior surface of the airfoil inserted into the opening has an outer periphery that is smaller than an inner periphery of the opening such that a gap is provided therebetween and the adhesive is injected into the gap.

In addition to one or more of the features described above, or as an alternative to any of the foregoing embodiments, the adhesive is an epoxy based adhesive.

In addition to one or more of the features described above, or as an alternative to any of the foregoing embodiments, the airfoil is formed from a carbon based composite.

In addition to one or more of the features described above, or as an alternative to any of the foregoing embodiments, the platform is formed from titanium.

In addition to one or more of the features described above, or as an alternative to any of the foregoing embodiments, the pull tab is formed from titanium.

In addition to one or more of the features described above, or as an alternative to any of the foregoing embodiments, the pull tab is located between the adhesive and an exterior surface of the airfoil inserted into the opening.

In addition to one or more of the features described above, or as an alternative to any of the foregoing embodiments, the pull tab is located between the adhesive and an inner periphery of the opening.

Also disclosed is a vane guide assembly for a gas turbine engine. The vane guide assembly having: an airfoil having a first end bonded to an opening of an outer diameter platform by an adhesive and a second end bonded to an opening of an inner diameter platform by an adhesive; a first pull tab partially located in the adhesive bonding the first end to the opening of the outer diameter platform, the first pull tab having a portion extending from a bondline formed by the adhesive bonding the first end to the opening of the outer diameter platform; and a second pull tab partially located in the adhesive bonding the second end to the opening of the inner diameter platform, the second pull tab having a portion extending from a bondline formed by the adhesive bonding the second end to the opening of the inner diameter platform.

In addition to one or more of the features described above, or as an alternative to any of the foregoing embodiments, the adhesive is an epoxy based adhesive.

In addition to one or more of the features described above, or as an alternative to any of the foregoing embodiments, the airfoil is formed from a carbon based composite.

In addition to one or more of the features described above, or as an alternative to any of the foregoing embodiments, the inner diameter platform is formed from titanium and the outer diameter platform is formed from titanium.

In addition to one or more of the features described above, or as an alternative to any of the foregoing embodiments, the first pull tab is formed from titanium and the second pull tab is formed from titanium.

Also disclosed is a method for testing a bond between an end of an airfoil and a platform of a vane guide assembly. The method including the steps of: inserting a pull tab partially into a gap between an exterior surface of the end of the airfoil and an opening in the platform; injecting an adhesive into the gap; curing the adhesive in order to form the bond between the end of the airfoil and the platform of the vane guide assembly, wherein a portion of the pull tab extends from a bondline of the cured adhesive; and pulling the portion of the pull tab until it either breaks or dislodges from the bondline.

In addition to one or more of the features described above, or as an alternative to any of the foregoing embodiments, the platform is an outer diameter platform or an inner diameter platform.

In addition to one or more of the features described above, or as an alternative to any of the foregoing embodiments, the adhesive is an epoxy based adhesive.

In addition to one or more of the features described above, or as an alternative to any of the foregoing embodiments, the airfoil is formed from a carbon based composite.

In addition to one or more of the features described above, or as an alternative to any of the foregoing embodiments, the platform is formed from titanium.

In addition to one or more of the features described above, or as an alternative to any of the foregoing embodiments, the pull tab is formed from titanium.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the FIGS.

Figure 1:
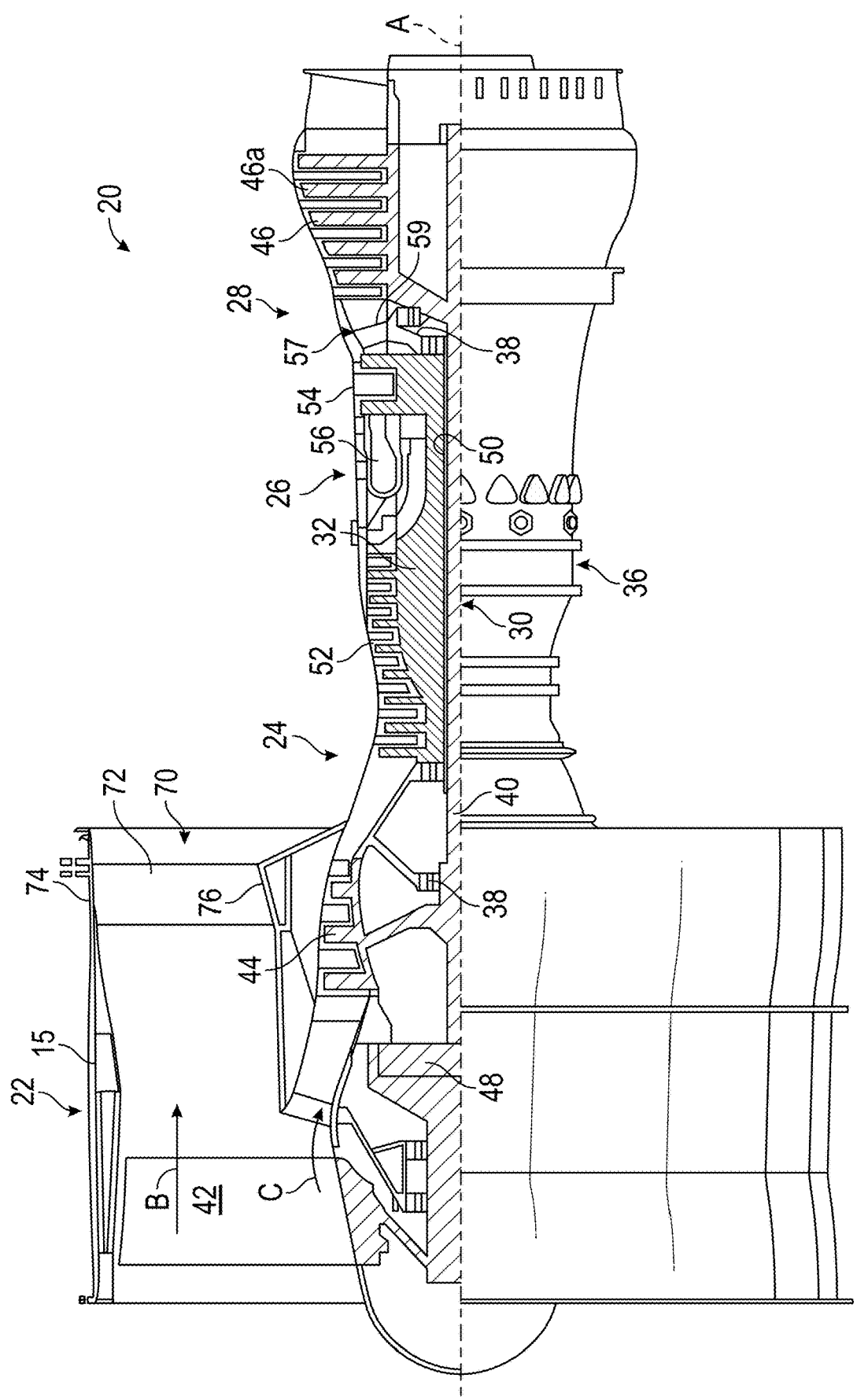
FIG. 1 is a schematic, partial cross-sectional view of a gas turbine engine in accordance with this disclosure.
Figure 2:
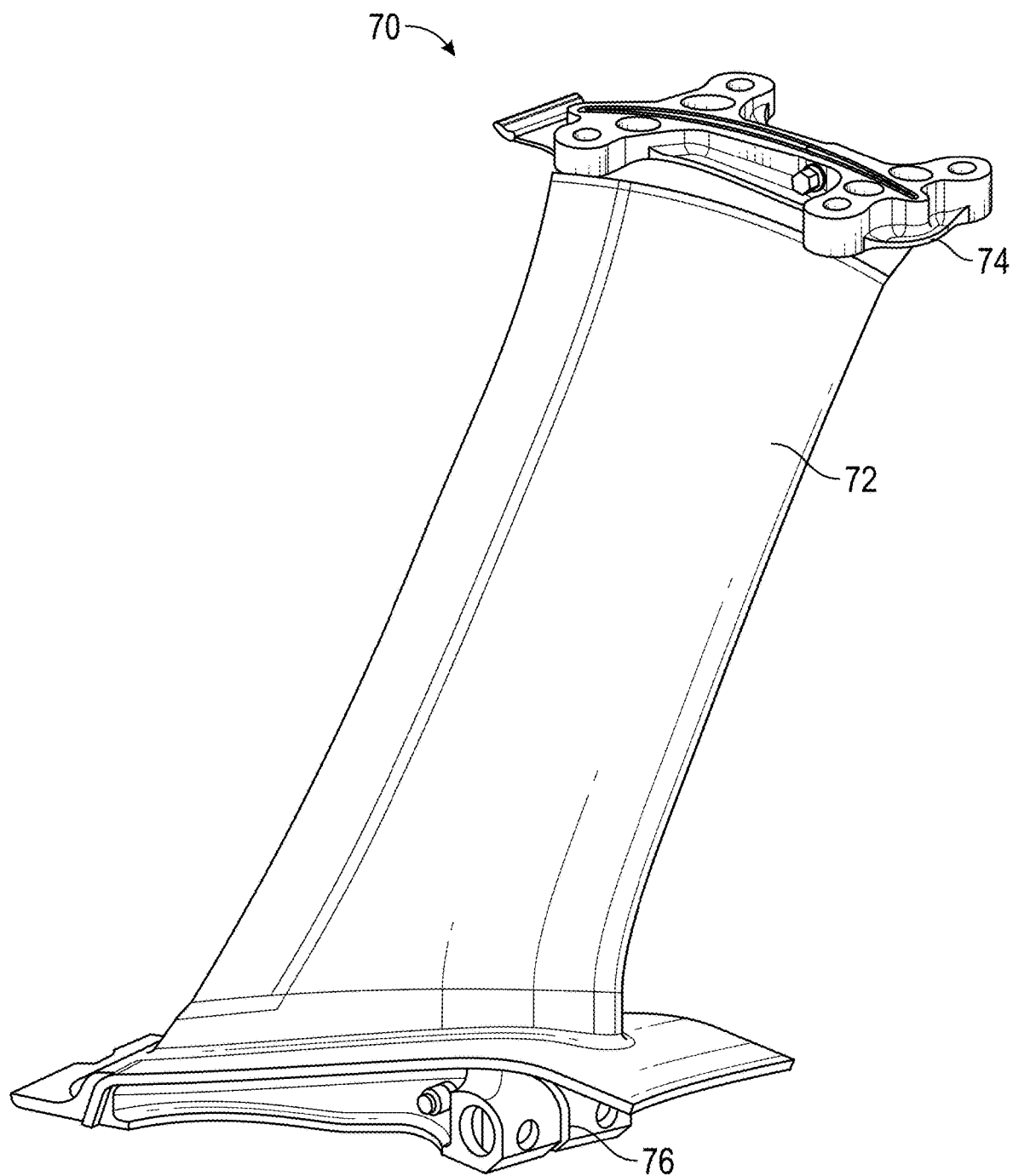
FIG. 2 is a perspective view of a guide vane in accordance with the present disclosure.
Figure 3:
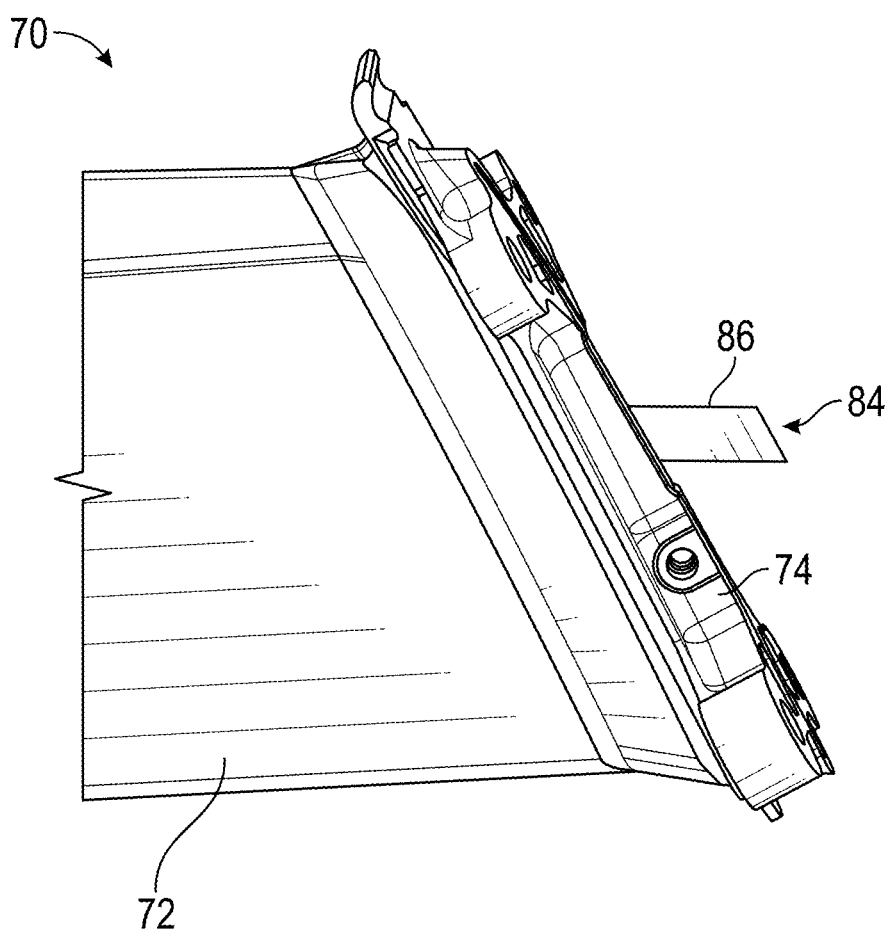
FIGS. 3-5 are enlarged perspective views of portions a guide vane in accordance with the present disclosure.
Figure 4:
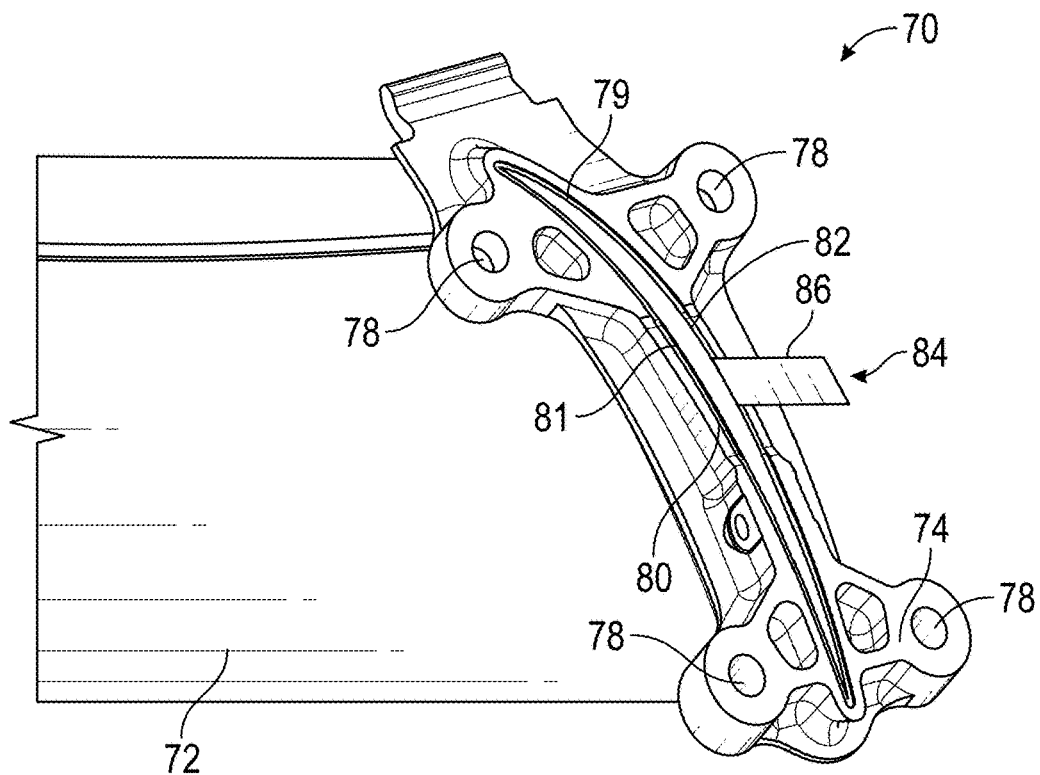
Figure 5:
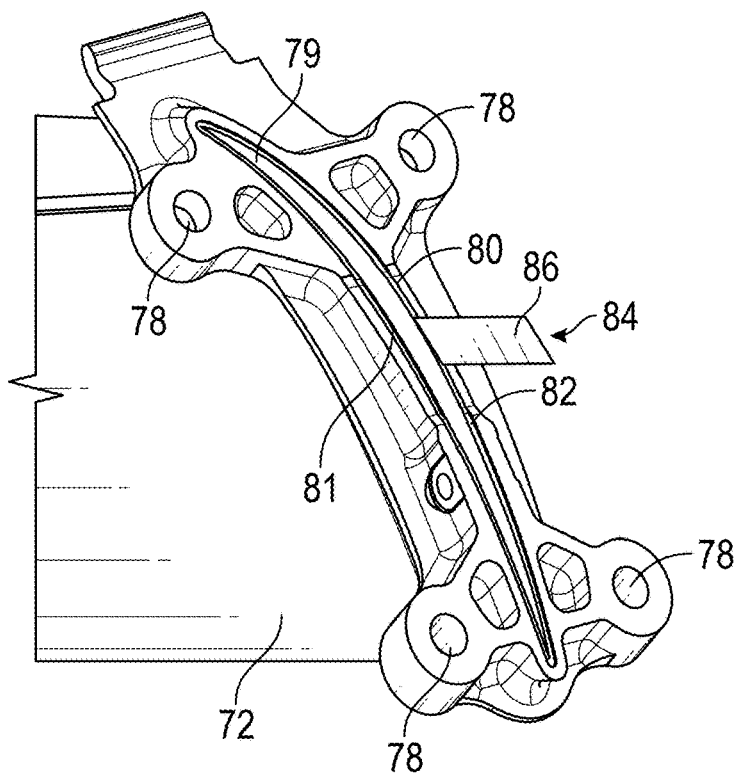

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first or low pressure compressor 44 and a first or low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second or high pressure compressor 52 and a second or high pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram° R)/(518.7° R)]^{0.5}$. The "Low corrected fan tip speed" as disclosed herein according to one non-limiting embodiment is less than about 1150 ft/second (350.5 m/sec).

In one non-limiting example, the fan 42 includes less than about 26 fan blades. In another non-limiting embodiment, the fan 42 includes less than about 20 fan blades. Moreover, in one further embodiment the low pressure turbine 46 includes no more than about 6 turbine rotors schematically indicated at 46a. In a further non-limiting example the low pressure turbine 46 includes about 3 turbine rotors. A ratio between the number of blades of the fan 42 and the number of low pressure turbine rotors 46a is between about 3.3 and about 8.6. The example low pressure turbine 46 provides the driving power to rotate the fan section 22 and therefore the relationship between the number of turbine rotors 46a in the low pressure turbine 46 and the number of blades in the fan section 22 discloses an example gas turbine engine 20 with increased power transfer efficiency.

A plurality of fan exit guide vane assemblies 70 are disposed within the bypass flow path B downstream of the fan section 22 and fan blades 42. Referring now to FIGS. 1-5, each fan exit guide vane assembly 70 includes an airfoil or vane 72 having its opposite ends supported between a platform such as an outer diameter platform or shoe 74 and an inner diameter platform or shoe 76. In other words and in one embodiment, the airfoil 71 has a first end secured to the outer diameter platform or shoe 74 and a second opposite end secured to the inner diameter platform or shoe 76. The airfoil 72 removes swirl and other directional components of airflow from the fan 42 to improve airflow properties and characteristics. As used herein, outer diameter platform or shoe 74 refers to the portion of the fan exit guide vane assembly 70 that is further from the engine center line axis A than the inner diameter platform or shoe 76 when the fan exit guide vane assembly 70 is secured to the gas turbine engine 20.

As mentioned above, the airfoils 72 of the fan exit guide vane assemblies 70 are bonded to the inner and outer platforms or shoes 74, 76. The platforms or shoes 74, 76 are then bolted to the engine by for example a bolt or fasteners (not shown) that pass through openings 78 of the platforms or shoes 74, 76. The distal ends 79 of the airfoils 72 are located in a complimentary opening 80 of the inner and outer platforms or shoes 74, 76 and an adhesive 82 is injected into a gap between an exterior surface 81 of the airfoil 72 and an inner surface of the opening 80 of the inner and outer platforms or shoes 74, 76. It being understood that the exterior surface 81 of the airfoil 72 inserted into opening 80 of the inner and outer platforms or shoes 74, 76 has a smaller outer periphery than the inner periphery of opening 80 such that a gap is provided for the adhesive to be injected thereon. Thereafter the adhesive is cured in order in order to form a bond between the distal end of the airfoil and the platform of the vane guide assembly it is inserted into. Once cured, the adhesive 82 provides a bond with a bondline that secures the airfoil 72 to the inner and outer platforms or shoes 74, 76.

In one non-limiting embodiment, the adhesive 82 is an epoxy based adhesive or equivalent thereof and the airfoil 72 is formed from a carbon based composite and the inner and outer platforms or shoes 74, 76 are formed from titanium. Of course, other materials are contemplated for the airfoil 72 and the inner and outer platforms or shoes 74, 76. Also, other adhesives 82 are contemplated for use with the present disclosure.

In order to provide a method for quickly and accurately testing the strength of the bond between the airfoils 72 of the fan exit guide vane assemblies and the inner and outer platforms or shoes 74, 76, a pull tab 84 is partially inserted into the gap provided between the exterior surface of the airfoil 72 and an inner surface of the opening 80 of the inner and outer platforms or shoes 74, 76 prior to the application or injection of the adhesive 82.

As such and upon curing of the adhesive, a portion of the pull tab 84 will be secured in the bond between the airfoil 72 and an inner surface of the opening 80 of the inner and outer platforms or shoes 74, 76 and another portion 86 will extend outwardly from the cured adhesive. In other words, the another portion 86 will extend outwardly from a bondline formed by the adhesive 82. In one embodiment, the pull tab 84 may be located adjacent to the inner surface of the opening 80 of the inner and outer platforms or shoes 74, 76 prior to bonding or alternatively, the pull tab 84 may be located adjacent to the exterior surface of the portion of the airfoil 72 inserted into the opening 80 of the inner and outer platforms or shoes 74, 76. Still further, the pull tab 84 may be spaced from the inner surface of the opening 80 of the inner and outer platforms or shoes 74, 76 as well as spaced from the exterior surface of the portion of the airfoil 72 inserted into the opening 80 prior to bonding. The another portion 86 (e.g., the portion extending outwardly from the cured adhesive) provides a method of testing the strength of the bond. Once the adhesive 82 has cured, the another portion 86 of the pull tab 84 is pulled and if the pull tab 84 breaks leaving the portion of the pull tab 84 that is secured in the bond between the airfoil 72 and an inner surface of the opening 80 of the inner and outer platforms or shoes 74, 76 behind a "good" bond has been provided. If however, the pull tab 84 is pulled and the portion of the pull tab 84 that was secured in the bond between the airfoil 72 and an inner surface of the opening 80 of the inner and outer platforms or shoes 74, 76 is released or comes out the bond or bondline formed by the adhesive, the bond may not be suitable and further testing may be required and/or the vane assembly 70 will have to be replaced or discarded.

In one non-limiting embodiment, the pull tab 84 is formed from titanium and is rectangular in shape having the following dimensions 1.0 inches by 0.250 inches and a thickness of 0.008". Of course, other dimensions and materials are contemplated for use with the pull tab 84.

In one implementation and prior to application of the adhesive 82, the pull tab 84 is inserted at least 0.250" into the bondline that will be formed by the adhesive 82. As such and after the bond cure (e.g., curing of the adhesive), if the portion 86 of the pull tab 84 breaks off leaving behind a 0.25"×0.25" portion of the pull tab 84 in the bondline, the bond will have passed the test or inspection. On the other hand if the entire pull tab 84 or more than portion 86 is pulled from the bondline, the bond fails the inspection and further testing of the bond may be required.

In one embodiment, a first pull tab 84 is inserted into the opening of the outer diameter platform or shoe 74 and a second pull tab 84 is inserted into the opening of the inner diameter platform or shoe 76.

Although only one guide vane assembly 70 is illustrated it is, of course, understood that a plurality of guide vane assemblies 70 as disclosed herein may be secured to the gas turbine engine 20.

Since the guide vane assemblies currently use a bonded-only joint to ensure structural capabilities to engine and currently there is no method to test each vane assembly to ensure the adhesive bond is of quality and full-load capable. The present disclosure provides a quick and efficient method and apparatus for testing the boned joint in order to determine if contaminations and/or other issues have occurred that could impact the bond quality yielding it a "weak" bond.

The present disclosure provides a way to test that no contaminant is affecting the bond and no degraded adhesive has been used. The method for testing may be implemented as follows: inserting a small titanium (Ti) strip into the bond line before bonding and curing; post bond cure, the strip (tab) is pulled and if the tab breaks off leaving a piece in the bondline, then there is proper bonding (not a weak bond). However, if the tab pulls out and free of the bondline, then there is the concern of a weak bond and further testing is suggested.

The test is relatively low cost to implement and the pull tab can be sized according to the bondline and structural requirements. The pull tab will not affect the structural integrity of the part and it will not break the part. As such, suppliers can quickly implement the pull test during production.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A vane guide assembly for a gas turbine engine, comprising:
    an airfoil having an end bonded to an opening of a platform by an adhesive; and
    a pull tab partially located in the adhesive and having a portion extending from a bondline formed by the adhesive.

2. The vane guide assembly as in claim 1, wherein the platform is an outer diameter platform or an inner diameter platform.

3. The vane guide assembly as in claim 1, wherein an exterior surface of the airfoil inserted into the opening has an outer periphery that is smaller than an inner periphery of the opening such that a gap is provided therebetween and the adhesive is injected into the gap.

4. The vane guide assembly as in claim 1, wherein the adhesive is an epoxy based adhesive.

5. The vane guide assembly as in claim 1, wherein the airfoil is formed from a carbon based composite.

6. The vane guide assembly as in claim 1, wherein the platform is formed from titanium.

7. The vane guide assembly as in claim 1, wherein the pull tab is formed from titanium.

8. The vane guide assembly as in claim 1, wherein the pull tab is located between the adhesive and an exterior surface of the airfoil inserted into the opening.

9. The vane guide assembly as in claim 1, wherein the pull tab is located between the adhesive and an inner periphery of the opening.

10. A vane guide assembly for a gas turbine engine, comprising:
    an airfoil having a first end bonded to an opening of an outer diameter platform by an adhesive and a second end bonded to an opening of an inner diameter platform by an adhesive;
    a first pull tab partially located in the adhesive bonding the first end to the opening of the outer diameter platform, the first pull tab having a portion extending from a bondline formed by the adhesive bonding the first end to the opening of the outer diameter platform; and
    a second pull tab partially located in the adhesive bonding the second end to the opening of the inner diameter platform, the second pull tab having a portion extending from a bondline formed by the adhesive bonding the second end to the opening of the inner diameter platform.

11. The vane guide assembly as in claim 10, wherein the adhesive bonding the first end to the opening of the outer diameter platform is an expoxy based adhesive and the adhesive bonding the second end to the opening of the inner diameter platform is an epoxy based adhesive.

12. The vane guide assembly as in claim 10, wherein the airfoil is formed from a carbon based composite.

13. The vane guide assembly as in claim 10, wherein the inner diameter platform is formed from titanium and the outer diameter platform is formed from titanium.

14. The vane guide assembly as in claim 10, wherein the first pull tab is formed from titanium and the second pull tab is formed from titanium.

15. A method for testing a bond between an end of an airfoil and a platform of a vane guide assembly, comprising:
    inserting a pull tab partially into a gap between an exterior surface of the end of the airfoil and an opening in the platform;
    injecting an adhesive into the gap;
    curing the adhesive in order to form the bond between the end of the airfoil and the platform of the vane guide assembly, wherein a portion of the pull tab extends from a bondline of the adhesive after it has cured; and
    pulling the portion of the pull tab until it either breaks or dislodges from the bondline.

16. The method as in claim 15, wherein the platform is an outer diameter platform or an inner diameter platform.

17. The method as in claim 15, wherein the adhesive is an epoxy based adhesive.

18. The method as in claim 15, wherein the airfoil is formed from a carbon based composite.

19. The method as in claim 15, wherein the platform is formed from titanium.

20. The method as in claim 15, wherein the pull tab is formed from titanium.

* * * * *